United States Patent [19]

Ikeda et al.

[11] 4,202,393
[45] May 13, 1980

[54] RUN FLAT TIRE FOR MOTORCYCLES

[75] Inventors: Ryo Ikeda; Yoichi Nogami; Teruo Koizumi, all of Hiratsuka, Japan

[73] Assignee: The Yokohama Rubber Co., Ltd., Tokyo, Japan

[21] Appl. No.: 928,162

[22] Filed: Jul. 26, 1978

[30] Foreign Application Priority Data

Aug. 1, 1977 [JP] Japan .................................. 52/92452

[51] Int. Cl.² ............................................. B60C 17/00
[52] U.S. Cl. ........................ 152/330 RF; 152/353 R; 152/354 R; 152/362 R
[58] Field of Search ............ 152/374, 362 R, 362 CS, 152/354 R, 330 R, 330 RF, 352 R, 352 A, 353 R, 353 C

[56] References Cited

U.S. PATENT DOCUMENTS

| 997,687 | 7/1911 | Michelin | 152/362 R |
|---|---|---|---|
| 3,509,929 | 5/1970 | Delobelle | 152/354 R |
| 3,904,463 | 9/1975 | Boileau | 152/362 R |
| 3,911,987 | 10/1975 | Takusagawa et al. | 152/354 |
| 3,942,573 | 3/1976 | Lawrence et al. | 152/330 RF |
| 3,994,329 | 11/1976 | Masson et al. | 152/354 |
| 4,121,641 | 10/1978 | Nakasaki | 152/354 R |
| 4,142,567 | 3/1979 | Johannsen et al. | 152/362 R |

FOREIGN PATENT DOCUMENTS

| 2449668 | 4/1975 | Fed. Rep. of Germany . |
|---|---|---|
| 2098744 | 10/1972 | France . |
| 2249778 | 11/1974 | France . |
| 2261888 | 9/1975 | France . |

*Primary Examiner*—John E. Kittle
*Attorney, Agent, or Firm*—Armstrong, Nikaido, Marmelstein & Kubovcik

[57] ABSTRACT

Disclosed is a run flat tire for motorcycles having a high handling stability, cornering stability and durability even when the tire is punctured during running and the pneumatic pressure inside of the tire becomes equal to atmospheric pressure. The run flat tire has a pair of sidewall-reinforcing layers each comprising (1) an elastic filler extending from an end location adjacent a bead core in a bead portion to the other end location in a tread portion through a sidewall portion of the tire and (2) at least one reinforcing ply which extends along one side surface of the elastic filler toward the tread portion, is turned up around the end of the elastic filler in the tread portion and which then further extends along the other side surface of the elastic filler toward the bead portion.

8 Claims, 3 Drawing Figures

RUN FLAT TIRE FOR MOTORCYCLES

BACKGROUND OF THE INVENTION

The present invention relates to a run flat tire for motorcycles. More particularly, the present invention relates to a pneumatic run flat tire for motorcycles, which tire is provided with reinforced sidewall portions having such a high rigidity that, even when the tire is punctured during running, the tire can support the load of the motorcycle and maintain a high durability and a high stearing stability thereof when the motorcycle is either running straight ahead or making a turn.

In conventional pneumatic tires which are usually used for four-wheel and two-wheel vehicles, an air chamber formed inside the tire is inflated by compressed air and the load of the vehicle is supported by the inflated air chamber having a high elasticity. Therefore, the sidewall portions of the conventional tires have a relatively low rigidity. In this type of conventional tires, when the compressed air leaks from the air chamber and the pneumatic pressure of the air chamber becomes equal to atmospheric pressure, the tire will collapse at the portion thereof which is in contact with the road surface under the weight of the vehicle in such a manner that each of the sidewall portions of the tire is folded on itself so as to project outwards from the tire-mounting rim. In this condition, the collapsed tire cannot absorb the lateral force applied to the sidewall portions of the tire when the vehicle makes a turn. The lateral force applied to the tire when the vehicle makes a turn, includes a cornering centrifugal force which is produced by giving a slip angle to the tire relative to the longitudinal center line of the vehicle during turning and also includes a cambering centrifugal force which is produced by inclining the tire relative to the vertical direction in accordance with a camber angle. Therefore, the sterring stability of the vehicle is significantly reduced. Also, the collapse of the tire results in an irregular rotation of the tire. The irregular rotation causes the vehicle body to produce undesirable vibrations and thus remarkably reduces the handling stability of the vehicle. When the tire is subjected to such irregular rotation at a high speed for a long period of time, the tire is mechanically destroyed and also thermally decomposed to such an extend that the tire can no longer be repaired. Furthermore, the irregular rotation of the collapsed tire frequently produces a separation of the tire body from the tire-mounting rim and a lateral turning of the vehicle. Both of these conditions are very dangerous for a driver.

In order to eliminate the above-mentioned disadvantages of the conventional pneumatic tires, various attempts to obtain improvements of the pneumatic tires have been made. For example, in one attempt, the tire body was firmly fixed to the tire-mounting rim so that the tire cannot be removed from the rim even when the tire is punctured during running.

In another attempt, the tire was provided with a supporting member which extends from the rim into the air chamber so as to support the tread portion when the tire is punctured and thus collapses.

In still another attempt, the tire body was mounted on the rim in such a manner that the tire can be firmly combined with the rim. Accordingly, the rim can at its flange, support, the load applied to the vehicle during running.

In a further attempt, the sidewall portions of the tire were made of a highly rigid material so as to prevent the tire from collapsing when the tire is punctured.

In a still further attempt, in order to increase the rigidity of the sidewall portion, an elastic reinforcing member having a high stiffness was arranged in the tire. This reinforcing member extends from the head portion to the tread crown portion through the sidewall portion, and is effective for preventing the tire from collapsing when it is punctured.

The above-mentioned attempts are each effective for improving the steering stability, handling stability and durability of a tire for four-wheel vehicles when the tire is punctured, but not satisfactory for improving such characteristics of a tire for two-wheel vehicles, that is, motorcycles. In the case where the four-wheel vehicle is cornering, the tire can incline in a small angle. Therefore, the camber angle provided to the tire is in a narrow range. Accordingly, when the four-wheel vehicle makes a turn, the lateral force applied to the tire due to the cambering force is very small. That is, the lateral force consists essentially of only a cornering force. However, when the motorcycle makes a turn, it is necessary to incline the tire relative to the vertical direction by a large camber angle. This turn of the motorcycle in the inclined condition produces a large lateral cambering force together with the cornering force exerted on the tire. This great lateral force should be absorbed by the tire even when the tire is punctured for the safety of the driver. Accordingly, the above-mentioned attempts which are effective for improving the tire of the four-wheel vehicles, are not always satisfactory for improving the tire of motorcycles. Generally speaking, the run flat tire for motorcycles is required to have the following features.

1. The apparent configuration of the tire is similar to that of the conventional tires.

2. Even when the pneumatic pressure of the air chamber of the tire is reduced to atmospheric pressure, the tire can be partly deformed but not caused to completely collapse.

3. Even when the tire is punctured, the punctured tire does not cause the motorcycle to have a reduced steering stability and handling stability in either straight running or cornering.

4. Even if the tire is punctured while the motorcycle is running at a high speed of from about 150 to 200 km/hour, the irregular rotation of the punctured tire does not cause the motorcycle body to produce undesirable vibrations and the motorcycle can be stopped with a high handling stability after running over a certain distance.

5. Even after the tire is punctured, the motorcycle can still run for several hundred kilometers at a velocity of 100 km/hour or less.

6. The tire is provided with means for preventing separation of the tire from the tire-mounting rim when the tire is punctured.

7. When the tire is punctured, the tire can be completely repaired for reuse and such repaired tire will have a high velocity running durability similar to that of the non-punctured tire.

8. The tire is a tubeless tire having a high durability.

9. Since the motorcycle is supported by only two tires, the tires can stably support the motorcycle during straight running.

However, it has been found that no conventional tires for motorcycles could satisfy all of the above-mentioned features.

An object of the present invention is to provide a run flat tire for motorcycles, which has the same configuration and running features as those of the conventional run flat tire when the tire is inflated with compressed air, and which has a high steering stability even when the tire is punctured.

Another object of the present invention is to provide a run flat tire for motorcycles, which has such a feature that even when the tire is punctured during running at a high speed of, for example, from about 150 to about 200 km/hour, the body of the motorcycle does not produce any vibrations, the handling stability of the motorcycle, either in straight running or in cornering, is not reduced and the velocity of the motorcycle can be increased or decreased without difficulty.

A further object of the present invention is to provide a run flat tire for motorcycle, which has such a high durability that the tire can be run at a high speed, for example, of about 90 km/hour or more, over a distance of several hundred kilometers without thermal decomposition and mechanical destruction even after the tire is punctured and the pneumatic pressure inside of the tire becomes equal to atmospheric pressure.

The other object of the present invention is to provide a run flat tire for motorcycles, which is provided with reinforced sidewall portions having a proper rigidity and elasticity effective for preventing the tire from collapsing when it is punctured.

SUMMARY OF THE INVENTION

According to the present invention, a run flat tire for motorcycle is provided, which tire comprises:
(A) a tread portion having two shoulder-shaped edges thereof;
(B) a pair of bead portions in each of which an annular bead core is embedded;
(C) a pair of sidewall portions each extending from one of the shoulder-shaped edges of the tread portion to one of the bead portions;
(D) a carcass composed of (a) a main portion thereof which extends from one of the bead cores to the other one thereof and which is embedded in the inside surface portions of the bead portions, sidewall portions and tread portions and (b) two end portions thereof each of which is turned up around the bead core and, then, which extends into the outside surface portion of the sidewall portion, such carcass ply containing at least one tire cord fabric, and;
(E) a pair of sidewall-reinforcing layers each comprising:
  (1) an elastic filler which extends from an end location adjacent the bead core to the other end location in the tread portion and which is embedded in the bead portion, sidewall portion and tread portion, and;
  (2) at least one reinforcing ply which extends along one side surface of the elastic filler toward the tread portion, is turned up around the end of the elastic filler in the tread portion and then which further extends along the other side surface of the elastic filler toward the bead portion, such reinforcing ply containing at least one tire cord fabric.

The run flat tire of the present invention is characterized by the reinforcing layers for the sidewall portions. Each reinforcing layer is composed of an elastic filler and at least one reinforcing ply. The elastic filler is embedded in the bead portion, sidewall portion and the tread portion and has one end thereof located adjacent the bead core and the other end thereof located in the tread portion. That is, the elastic filler extends from an end location thereof adjacent the bead core to the other end location thereof in the tread portion through the sidewall portion and the shoulder-shaped edge of the tread portion.

The reinforcing ply contains at least one tire cord fabric and extends along one side surface of the elastic filler, for example, facing the inside surface of the tire body, toward the tread portion, turns up around the end of the elastic filler located in the tread portion and then further extends along the other surface of the elastic filler, for example, facing the outside surface of the tire body, toward the bead portion. Both ends of the reinforcing ply may be located either in the bead portion or in the sidewall portion, respectively.

DESCRIPTION OF THE PREFERRED EMBODIMENTS

Figure 1:
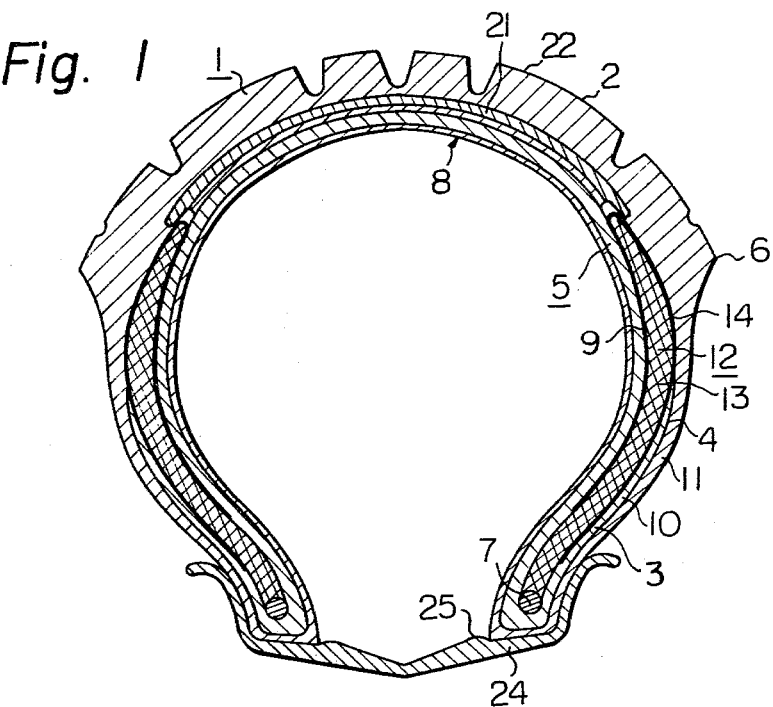
FIG. 1 is a cross-sectional view of an embodiment of the run flat tire of the present invention.

FIG. 1 shows a run flat tire body 1 for motorcycles according to the present invention having a tread portion 2, a pair of bead portions 3, a pair of sidewall portions 4 and a carcass 5. The tread portion 2 has two sholder-shaped edges 6 each of which are connected to end of the sidewall portions 4. Each of the sidewall portion 4 is connected to each of the bead portions. Each of a pair of axially spaced annular bead cores 7 is embedded in one of the bead portions 3.

Figure 2:
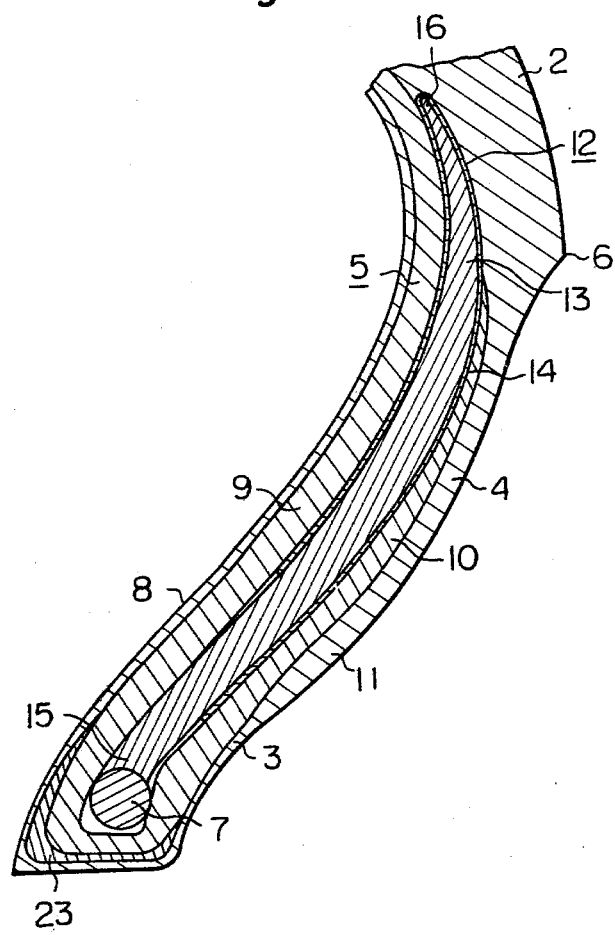
FIG. 2 is a cross-sectional view of a part of an embodiment of the run flat tire of the present invention containing a bead portion, a sidewall portion and a shoulder-shaped edge portion of a tread portion.

The carcass 5 is composed of a main portion 9 and two end portions 10. The main portion 9 of the carcass 5 is extended from one of the bead cores 7 to the other one thereof through, in sequence, one of the bead portions, one of the sidewall portionss, the tread portion, the other one of the sidewall portions and the other one of the bead portions. The main portion is embedded in the inside surface layers 8 of the above-mentioned portions. Each of the two end portions 10 of the carcass 5 is turned up around one of the bead cores 7, and extended into one of the sidewall portions through one of the bead portions. The end portion becomes embedded in the outside surface layers 11 of the above-mentioned portions. It is preferable that the end portion 10 of the carcass terminates at a location at or very close to the shoulder-shaped edge of the tread portion 2. This type of end portion 10 of the carcass is effective for enhancing the rigidity of the sidewall portion 4 of the tire. Referring to FIGS. 1 and 2, the carcass 5 may comprise one or more, preferably, from 2 to 4, carcass plies each composed of at least one tire cord fabric coated with an elastic polymer material. The tire cord fabric may be made of nylon 6, nylon 66, polyethylene terephthalate, rayon, insolubilized polyvinyl alcohol or steel cords. The cords may each consist of at least for the one filament yarn and have a total denier of 840 to 1650. The elastic polymer material by which the tire cord fabric is coated, may be selected from natural rubber, synthetic rubbers, and blends of two or more of the above-mentioned rubbers.

It is preferable that the direction of the warp cord in the carcass ply intersects the equator line, that is, circumference line, of the tire. The angle between the direction of the warp cords and the equator line is preferably in a range of from 28 to 38 degrees. This type of carcass ply arrangement is effective for enhancing the rigidity of the tire body. Accordingly, when the tire is deformed by a load thereon this type of carcass ply can uniformly resist against such deformation. If the deformation of the tire is unevenly resisted, the tire will be deformed unevenly. Such uneven deformation will cause a decrease in the durability of the tire. The run flat tire 1 of the present invention has a pair of sidewall-reinforcing layers 12 which are effective for preventing the collapse of the tire when the tire is deflated. Such reinforcing layers can enhance the rigidity of the sidewall portions. Referring to FIG. 2, the sidewall-reinforcing layer 12 is composed of an elastic filler 13 and a reinforcing ply 14. The elastic filler 13 is extended from the bead portion 3 to the tread portion 2 through the sidewall portion 4 and the shoulder-shaped edge 6 of the tread portion 2, and is then embedded in the above-mentioned portions. It is important that the elastic filler 13 has one end 15 thereof situated adjacent to the bead core 7 and the other end 16 thereof located in the tread portion 2. The end 15 of the elastic filler 13 may be either in contact with the bead core 7 as shown in FIGS. 1 and 2 or spaced from the bead core 7 by a very small distance. It is also important that the other end 16 of the elastic filler 13 penetrates into the tread portion 2 over the shoulder-shaped edge portion thereof. That is, one end portion of the elastic filler 13 is firmly fixed into the bead portion 3 and the other end portion thereof is also firmly fixed into the tread portion 2.

In the above-mentioned arrangement of the elastic filler 13, the rigidity of the sidewall portion can be remarkably enhanced. However, the rigidity of the sidewall portion can be additionally enhanced by incorporating the reinforcing ply 14 with the elastic filler 13. The reinforcing ply 14 is especially effective for increasing the rigidity of a portion of the sidewall portion close to the shoulder-shaped edge of the tread portion.

In FIG. 1, the reinforcing ply 14 extends continuously upward along one surface of the elastic filler 13, turns up around the end 16 of the elastic filler 13 and, then, further extends downward along the other side surface of the elastic filler 13. That is, the reinforcing ply 14 is folded at the end 16 of the elastic filler 13 on the elastic filler so that the elastic filler 13 is caused to be interposed between the two parts of the folded reinforcing ply 14. The reinforcing ply 14 contains at least one tire cord fabric coated with an elastic rubber material. The two ends of the reinforcing ply 14 are located, independently from each other, either in the bead portion 3 or in the sidewall portion 4. Usually, the reinforcing ply 14 is adhered to the elastic filler 13.

The elastic filler 13 preferably has an elastic modulus of from 40 to 75 kg/cm$^2$ at an elongation of 100% and a Shore hardness of from 70 to 90. The elastic filler may be made of a vulcanized natural rubber, synthetic rubbers or blend of two or more of the above-mentioned rubbers. Also, it is preferable that the elastic filler has a maximum thickness corresponding to from 20 to 60 percent of the maximum thickness of the sidewall portion 4.

The tire cord fabric to be contained in the reinforcing ply may be selected from conventional tire cord fabrics. That is, the tire cord fabric may be made of nylon 6, nylon 66, polyethylene terephthalate, rayon, insolubilized polyvinyl alcohol or steel cords. The cords may each consist of at least one filament yarn and should preferably have a denier of from 840 to 1650. The elastic polymer material to be coated on the reinforcing ply may be selected from conventional cord-coating agents.

It is preferable that the direction of the warp cords in the reinforcing ply intersects the equator line of the tire. The angle between the direction of the warp cords and the equator line is preferably in a range of from 40 to 65 degrees. This type of arrangement of the reinforcing ply is very effective for increasing the rigidity of the sidewall portion of the tire, because such arrangement produces a large uniform resistance in the reinforcing ply which can counteract the deformation of the sidewall portion under a load. That is, this type of the reinforcing ply is effective for preventing an irregular deformation of the sidewall portion.

Furthermore, for increasing the processability and durability of the tire, it is preferable that the angle between the direction of the warp cords in the reinforcing ply and the equator line of the tire be greater than that between the direction of the warp cords in the carcass ply and the equator line of the tire, because this type of arrangement of the carcass ply and the reinforcing ply can remarkably increase the rigidity of the sidewall portion and simplify the production of the tire.

The sidewall-reinforcing layer may be located between the inside surface of the tire body and the main portion of the carcass, between the end portion of the carcass and the outside surface of the tire body, or between the carcass plies in the main portion of the carcass. However, it is most preferable that the sidewall-reinforcing layer be interposed between the main portion and the end portion of the carcass.

Referring to FIG. 1, the tread portion 2 can contain therein a reinforcing breaker layer 21 located between the carcass ply 5 and the outside surface 22 of the tread portion 2. This breaker layer 21, which is composed of at least one tire cord fabric coated with an elastic polymer as mentioned hereinbefore, is effective for reinforcing the tread portion 2. The tire cord fabric may be made of conventional tire cord yarns as mentioned hereinbefore. It is also preferable that the direction of the warp cords in the breaker layer intersects the equator line of the tire by an angle of, for example, from 25 to 50 degrees.

When the tire is inclined from the vertical direction by a chamber angle, and the tire is brought into contact with the surface of road at the shoulder-shaped edge portion of the tread portion, a large bending force is applied not only to the sidewall portion but also to the tread portion so as to deform these portions. If the tread portion exhibits a poor resistance to the deformation and is therefore greatly deformed, the steering stability of the motorcycle during cornering will become poor. Accordingly, the provided breaker layer is effective for enhancing the rigidity of the tread portion and the steering stability of the motorcycle during cornering. Especially, the breaker layer is more useful in large tires than in small tires.

Referring to FIG. 2, the bead portion 3 may contain therein a chafer strip 23 which is located around the bead core 7 so as to wrap the portion of the carcass ply 5 which is turned up around the bead core 7. This chafer strip 23 is composed of at least one tire cord fabric which is coated with an elastic polymer. The chafer strip 23 is effective for increasing the rigidity of the bead portion 3.

Referring to FIG. 1, a rim 24 on which the tire 1 can be mounted has a hump 25. This hump 25 is effective for preventing the separation of the tire 1 from the rim 24 due to the slipping of the bead portion 3 while the motorcycle is running.

When the run flat tire is a tubeless tire, the inside surface of the tire is lined with an air-nonpermeable layer.

EXAMPLES 1 THROUGH 5 AND COMPARISON EXAMPLES 1 AND 2

In Example 1, a pneumatic run flat tire for motorcycle having a displacement of 1000 ml was produced. This tire had a structure as shown in FIG. 1. The carcass was composed of four carcass plies which comprised a tire cord fabric made of rayon tire cords of 1650 denier/2 yarns and coated with vulcanized natural rubber. The carcass was arranged in the tire in such a manner that the angle between the direction of the warp cords in the carcass plies and the equator line of the tire was 32 degrees. The elastic filler had a maximum thickness of a 6 mm which corresponded to 38% of the maximum thickness of the sidewall portion of the resultant tire. The elastic filler was made of a conventional hard rubber compound having an elastic modulus of 65 $kg/cm^2$ at an elongation of 100% and a Shore hardness of 80. The reinforcing ply for the elastic filler was composed of a tire cord fabric made of rayon tire cords of 1650 denier/2 yarns. The angle between the warp cords in the reinforcing ply and the equator line of the tire was 50 degrees. The reinforcing breaker layer located in the tread portion was made of two rayon tire cord fabrics in which each cord was composed of two yarns and had a denier of 1650, in the same way as that of the carcass ply. The angle between the warp cords in the breaker ply layer and the equator line of the tire was 28 degrees.

The sidewall reinforcing layer was located, in the manner shown in FIGS. 1 and 3, between the main portion and the turned-up end portion of the carcass, and an end of the sidewall reinforcing layer was in contact with the bead core.

In Example 2, the same procedures as those mentioned above were carried out except that no breaker layer was arranged in the tread portion.

In Example 3, the same procedures as those described in Example 1 were carried out, except that each of a pair of the sidewall reinforcing layers was arranged between the main portion of the carcass and the inside surface layer of the tire. Each reinforcing layer extends from the bead portion into the tread portion through the sidewall portion.

In Example 4, the same procedures as those mentioned in Example 1 were carried out, except that each of a pair of the sidewall reinforcing layers was arranged between the end portion of the carcass and the outside surface layer of the tire. Each reinforcing layer extends from the bead portion into the tread portion through the sidewall portion.

In Example 5, the same procedures as those described in Example 1 were carried out, except that a pair of the sidewall reinforcing layers was located between the main portions of two carcass plies and the main portions of the other two carcass plies. The reinforcing layer extends from the bead portion into the tread portion through the sidewall portion.

In Comparison Example 1, the same procedures as those mentioned in Example 2 were carried out, except that no sidewall reinforcing layer was arranged in the tire.

In Comparison Example 2, the same procedures as those mentioned in Example 5 were carried out, except that no reinforcing ply was incorporated into the elastic filler.

Each of the above-prepared tires was subjected to the following durability tests.

The tire was run on a running tester under a load of 206 kg at a speed of 90 kg/hour. The pneumatic pressure of the inside space of the tire was equal to atmospheric pressure. After testing for one hour, no damages were found on the tires of Examples 1 through 5, while the tires of Comparison Examples 1 and 2 were damaged at the sidewall portions thereof.

Each tire was inflated at a pneumatic pressure of 2.8 $kg/cm^2$ and run on a running tested under a load of 206 kg at a speed of 120 km/hour for 30 minutes, and, then, every 30 minutes thereafter, the speed was raised by 8 kg/hour.

All of the tires of Examples 1 through 5 and comparison Examples 1 and 2 could reach the speed of 208 km/hour without any damage occurring thereto.

Furthermore, each uninflated tire was run on a running tester under a load of 206 kg. It was observed that after running for 270 km, no damages were found on the tire of Example 1. The tires of Examples 2, 3, 4 and 5 could respectively run for 230, 200, 200, and 200 km without any damage occurring. However, the tires of Comparison Examples 1 and 2 were damaged at the sidewall portions thereof when they ran for 12 km and 140 km, respectively.

The features of the tested tires were evaluated as shown in Table 1, below.

Table 1

| Example No. | Handling stability during straight running | Cornering stability | Durability |
|---|---|---|---|
| 1 | 5 | 5 | 5 |
| 2 | 5 | 4 | 4 |
| 3 | 4 | 3 | 4 |
| 4 | 3 | 3 | 4 |
| 5 | 4 | 4 | 4 |
| Comparison Example | | | |
| 1 | 1 | 1 | 1 |
| 2 | 4 | 3 | 3 |

Note:
class 5 : excellent
class 4 : very good
class 3 : good (normal)
class 2 : poor
class 1 : very poor (useless)

As the above-mentioned examples and comparison examples clearly show, the sidewall reinforcing layers of the present invention are very effective for enhancing the handling stability, cornering stability and durability of the run flat tire for motorcycles, even when the tire is punctured and the pneumatic pressure is thus lost from the air chamber inside of the tire.

What is claimed is:

1. A run flat tire for motorcycles, comprising:
   (A) a tread portion having two shoulder-shaped edges thereof;

(B) a pair of bead portions in each of which an annular bead core is embedded, (C) a pair of sidewall portions each extending from one of the shoulder-shaped edges of said tread portion to one of said bead portions, (D) a carcass composed of (a) a main portion thereof extending from one of said bead cores to the other one thereof and embedded in the inside surface layer of said bead portions, sidewall portions, and tread portion and (b) two end portions thereof, each turned up around the bead core and, then, extending into the outside surface layer of said sidewall portion, said carcass ply containing at least one tire cord fabric, and (E) a pair of sidewall-reinforcing layers, each comprising:

(1) an elastic filler extending from an end location adjacent said bead core to the other end location in said tread portion and embedded in said bead portion, sidewall portion and tread portion, said elastic filler having an elastic modulus of from 40 to 75 kg/cm, at an elongation of 100% and a Shore hardness of from 70 to 90, and (2) at least one reinforcing ply extending along one side surface of said elastic filler toward said tread portion, turned up around the end of said elastic filler in said tread portion and then further extending along the other side surface of said elastic filler toward said bead portion, said reinforcing ply containing at least one tire cord fabric.

2. A run flat tire as claimed in claim 1, wherein each sidewall-reinforcing layer is interposed between the main portion and the end portion of said carcass ply.

3. A run flat tire as claimed in claim 1, wherein the end of said elastic filler is in contact with said bead core.

4. A run flat tire as claimed in claim 1, wherein said tread portion contains therein a reinforcing breaker layer located between said carcass ply and the outside surface of said tread portion.

5. A run flat tire as claimed in claim 1, wherein the direction of the warp cords in said carcass ply intersects the equator line of said tire.

6. A run flat tire as claimed in claim 1, wherein the direction of the warp cords in said reinforcing ply intersects the equator line of said tire.

7. A run flat tire as claimed in any of claims 5 or 6, wherein the angle between the direction of the warp cords in said reinforcing ply and the equator line of said tire is greater than that between the direction of the warp cords in said carcass ply and the equator line of said tire.

8. A run flat tire as claimed in claim 1, wherein said elastic filler has a maximum thickness corresponding to from 20 to 60% of the maximum thickness of said sidewall portion.

* * * * *